United States Patent Office 3,522,250
Patented July 28, 1970

3,522,250
**DERIVATIVES OF 7-AMINOCEPHALO-
SPORANIC ACID**
Richard M. Kerwin, West Chester, William Dvonch, Radnor, and Harvey E. Alburn, West Chester, Pa., assignors to American Home Products Corporation, New York, N.Y., a corporation of Delaware
No Drawing. Filed Oct. 15, 1968, Ser. No. 767,827
Int. Cl. C07d 99/24
U.S. Cl. 260—243                     3 Claims

ABSTRACT OF THE DISCLOSURE 7-aminocephalosporanic acid (7-ACA) is directly produced in good yield from cephalothin by enzymatic deacylation using a strain of *Escherichia coli* identified as ATCC 9637 to provide the enzyme. The product is then reacylated with a carboxylic acid mixed anhydride or acid halide to produce new and useful cephalosporins having antimicrobial activity.

BACKGROUND OF THE INVENTION

The deacylation of penicillin to produce 6-amino-penicillanic acid has been carried out on various penicillins and with various deacylating agents, involving either chemical means or microbiological procedures. In the latter case various organisms have been used to provide the enzymes (amidases) which are believed to cause the necessary splitting reaction. One microorganism that has been mentioned as capable of effecting deacylation is *E. coli*.

A few of the procedures for producing 6-aminopenicillanic acid have been carried over in deacylating the cephalosporins to produce $\Delta^3$-7-aminocephalosporanic acid (7-ACA) which, of course, is later used for producing new semisynthetic cephalosporins. Thus, for example, in a Cheney et al. patent, No. 3,284,451, granted Nov. 8, 1966, there is disclosed certain deacylation procedures for producing 7-ACA, notably relying on the use of various amidase producing microorganisms mentioned in the prior art, including *Escherichia coli*. However, this patent disclosure indicated a need or advantage in an initial step of "activating" a cephalosporin by forming an "activated ester" before deacylating. Thereafter, following the production of activated 7-ACA, there is a third step of cleaving off the activating moiety. Apparently, the theory of first activating the cephalosporin prior to amidase deacylation was to obtain increased yields because the activated ester was stated to yield "vastly improved solubility in organic solvents, greater thermal stability and improved stability toward acidic reagents."

On the other hand, it has been found that if one uses a particular strain of the microorganism *E. coli*, the activating procedure is unnecessary and one may actually obtain superior yields of 7-ACA from the cleavage operation alone.

This invention relates to a process of deacylating cephalothin to 7-aminocephalosporanic acid and the reacylation of the latter to new and useful cephalosporins.

The process of the invention involves an enzymatic cleavage or deacylation of cephalothin or a salt thereof having the chemical structure:

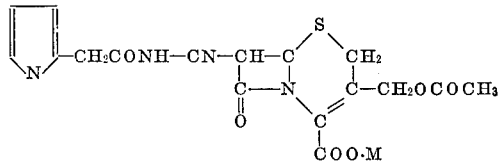

where M represents hydrogen or a cation such as sodium or potassium.

The microorganism found to achieve the desired deacylation in good yield is a strain of *E. coli*, identified as *E. coli*, ATCC 9637.

To carry out the procedure of the invention, the selected *E. coli* strain is cultured in any known growth medium for this organism and then removed therefrom after satisfactory growth has been obtained. The cells are then suspended in water, the pH is adjusted to a range of about 6.2–8.5, but preferably above 7.5 and below 8.0. To the cell suspension is added the cephalosporin to be deacylated. The temperature is held in a range of about 20° to 40° C., preferably about 25° C. The deacylation may be followed by chromatographing samples from time to time. The reaction has been found to become complete in about 2 hours.

To obtain the 7-ACA from the reaction mixture, the latter is acidified to about pH 3, the cellular material is removed, and the liquid portion of the reaction is extracted with an organic solvent to remove unreacted organic matter and the aqueous fraction containing the desired product is then treated to precipitate the 7-ACA in crystalline form.

To obtain the desired cephalosporin, the 7-ACA product is reacted with the selected acid mixed anhydride or acid halide at low temperature in the range of —10° to 0° C. and under mildly alkaline conditions, using, for example, triethylamine. The desired product may be obtained either in the form of the free carboxylic acid or, as desired, in the form of a pharmaceutically acceptable, nontoxic salt.

The acid or acid halides contemplated for use in the above-mentioned 7-ACA reacylation reaction are those illustrated by Formula I or II.

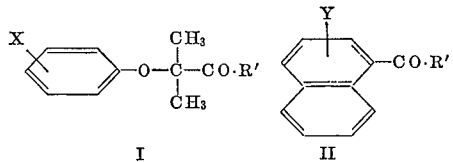

I                  II in which R' is either OH or halogen, preferably chlorine, bromine, or iodine, X is halogen, namely, chlorine, bromine, iodine, or fluorine, but preferably chlorine, while Y is lower alkoxy of 1 to 3 carbon atoms, but preferably ethoxy. The products formed would then have the formula:

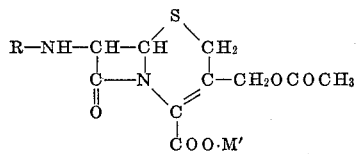

in which R represents the halophenoxy-2-methyl propionyl radical of Formula I or the lower alkoxynaphthoyl radical of Formula II while M' represents hydrogen or a pharmaceutically acceptable cation.

Illustrative of contemplated salts are such nontoxic salts as the sodium, potassium, calcium, ammonium, procaine, and N,N'-disubstituted alkylenediamine, i.e., dibenzylethylenediamine salts. The salts are to be considered as the equivalent of the compounds described and claimed and may be used as the compounds themselves in various solid, aqueous, or oleaginous compositions as described below.

The compounds of the invention have been found to be effective antibacterial agents from in vitro studies carried out by standard procedures. One scientifically acceptable test is an agar serial dilution procedure indicating the least amount of compound, namely, the minimum inhibitory concentration, expressed in µ/ml., that completely inhibits the test organism. By the aforesaid bioassay procedure, the compounds of the invention were found active against both gram-positive and gram-negative organisms, and with respect to the former, were notably active against resistant strains of *Staphylococcus aureus*.

The bioassay results indicate utility of the compounds in experimental and comparative microbiology and also useful for topical application, for example, in the treatment of wounds or burns by incorporation in lotions or salves, or in soaps or shampoos, or in disinfectant compositions or in animal feedstuffs.

Turning now to a more detailed description of the process steps, and the preparation of illustrative products, the best mode contemplated for carrying out the invention is given in the form of specific examples. It should be noted that temperatures as given are in degrees centigrade.

Example 1.—Preparation of 7-aminocephalosporanic acid

*Escherichia coli* cells, strain ATCC 9637, were removed from a growth medium by centrifugation. 120 grams (wet weight) of cells were resuspended in 1500 ml. distilled water. 15 grams of sodium cephalothin were added to the suspension which was stirred constantly by a magnetic stirrer. The pH was adjusted to 7.8 with 0.5 N NaOH, and maintained at a pH of 7.6–7.8 at 25° C.

The deacylation was followed by chromatographing samples on Whatman No. 4 paper developed with n-butanol, glacial acetic acid, water; 60, 15, 25 v./v. The papers were dried in air, sprayed with 0.5 N NaOH, dried again and sprayed with a starch-iodine preparation. The compounds with a β-lactam moiety showed up as white spots on a blue field. By this method it was determined that the reaction was virtually complete in 2 hours, i.e., all the cephalothin had reacted.

The pH was adjusted to 3.5 and the cells were removed by centrifugation. Unchanged cephalosporin and acid products were removed by extraction with three 1500 ml. portions of ethyl acetate after adjustment of the pH to 2.0. The aqueous fraction was adjusted to pH 3.5 and let stand overnight at 5° to finish crystallization. The first crop was filtered off, washed, and dried, 5.64 g. (57% yield). The mother liquor was concentrated to incipient crystallization and treated as above. Second crop, 1.63 g. (17% yield). The mother liquor from the second crop upon freeze-drying yielded a solid which gave a low hydroxamate color yield and was discarded.

The two crystalline crops (74% combined yield) analyzed as follows:

*Analysis.*—Calcd. for $C_{10}H_{12}N_2O_5S$ (percent): C, 44.11; H, 4.44; N, 10.31; O-acetyl, 15.45. Found (percent): C, 44.02; H, 4.51; N, 10.26; O-acetyl, 14.95.

This was for an Abderhalden dried sample; about a 1% weight loss was found.

Spectrum:

$\lambda_{max.}^{KBr}$ 5.56 (β-lactam), 5.76 (ester carbonyl)

Example 2.—Sodium 7-[2-(p-chlorophenoxy)-2-methylpropionamido]-cephalosporanate

Ethyl chloroformate (0.49 ml., 0.005 mole) was added to an ice-cold solution of 2-(p-chlorophenoxy)-2-methylpropionic acid (1.08 g., 0.005 mole) and triethylamine (0.85 ml., 0.006 mole) in acetone (42 ml.). The mixture was stirred at 0° for 10 min. and then cooled to −50° in a Dry-Ice-acetone bath. With vigorous stirring, an ice-cold solution of 7-ACA (1.63 g., 0.006 mole) in 3% sodium bicarbonate (42 ml., 0.015 mole) was added. The temperature was kept below 0° during addition. The mixture was then stirred for 30 minutes at 0°, 30 minutes at 25°, and extracted with ether (3 × 40 ml.). The aqueous phase was adjusted from pH 8.7 to 2.0 with 6 N hydrochloric acid and extracted with methyl isobutyl ketone (3 × 30 ml.). An equal volume of water was added to the organic phase, and the pH adjusted to 6.0 with 3% sodium bicarbonate. The aqueous phase was separated, concentrated, and freeze-dried to yield the sodium salt, 1.1 g. (45% yield).

This compound when tested experimentally (bioassay) by a standard agar serial dilution procedure showed the following spectrum of activity:

| Organism: | MIC, µ/ml. |
|---|---|
| *Bacillus subtilis* ATCC 6633 | 31.5 |
| *Staphylococcus aureus* ATCC 6538P | 15.6 |
| *Staphylococcus aureus* Smith | 15.6 |
| *Escherichia coli* ATCC 6880 | 125.0 |
| *Salmonella paratyphi* ATCC 11737 | 250.0 |
| *Enterobacter aerogenes* ATCC 884 | 125.0 |
| *Klebsiella pneumoniae* ATCC 10031 | 250.0 |

Example 3.—7-(2-ethoxynaphthamido)cephalosporanic acid

7-ACA (1.36 g., 0.005 mole) was suspended in methylene chloride (25 ml.) and triethylamine (1.77 ml. 0.0125 mole) was added, and the mixture stirred until dissolved and then cooled to 0–5°. 2-ethoxynaphthoyl chloride was added, and the reaction mixture stirred for 30 minutes and poured into 50 ml. ice-water. The layers were separated, and the organic layer extracted with more water (25 ml.). The aqueous extracts were combined, the pH adjusted from pH 9.5 to 2.0 with 6 N hydrochloric acid, and the solution was extracted with ethyl acetate (3 × 20 ml.). The organic extract was dried over sodium sulfate and concentrated to an oil which crystallized upon storage over silica gel, 0.8 g. (34% yield), M.P. 152–157°.

*Analysis.*—Calcd. for $C_{23}H_{22}N_2O_7S$ (percent): C, 58.7; H, 4.7; N, 6.0. Found (percent): C, 59.2; H, 4.8; N, 5.7.

When submitted to bioassay against various organisms, the following spectrum was obtained:

| Organism: | MIC, µ/ml. |
|---|---|
| *Bacillus subtilis* ATCC 6633 | 15.6 |
| *Staphylococcus aureus* ATCC 6538P | 7.81 |
| *Staphylococcus aureus* Smith | 7.81 |
| *Escherichia coli* ATCC 6880 | 31.3 |
| *Escherichia intermedia* ATCC 65–1 | 125.0 |
| *Salmonella paratyphi* ATCC 11737 | 125.0 |
| *Enterobacter aerogenes* ATCC 884 | 250.0 |
| *Klebsiella pneumoniae* ATCC 10031 | 1.95 |

The invention claimed is:

1. A compound having the formula:

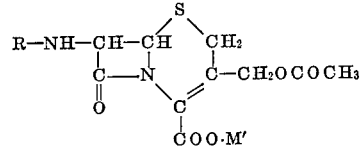

in which R stands for a member of the group consisting of chlorophenoxy-2-methylpropionyl and 2-ethoxynaphthoyl while M' represents hydrogen or a pharmaceutically acceptable cation.

2. The compound of claim 1; in which R stands for p-chlorophenoxy-2-methylpropionyl.

3. The compound of claim 1; in which R stands for 2-ethoxynaphthoyl.

References Cited

UNITED STATES PATENTS 3,222,363   12/1965   Flynn.
3,338,897   7/1967   Takano et al.

NICHOLAS S. RIZZO, Primary Examiner

U.S. Cl. X.R.

195—29; 424—246